United States Patent
Bishop

(10) Patent No.: US 9,472,087 B1
(45) Date of Patent: Oct. 18, 2016

(54) ELECTRIC FENCE MONITOR INCLUDING AN AIR GAP

(71) Applicant: John Bishop, Cookeville, TN (US)

(72) Inventor: John Bishop, Cookeville, TN (US)

(*) Notice: Subject to any disclaimer, the term of this patent is extended or adjusted under 35 U.S.C. 154(b) by 294 days.

(21) Appl. No.: 14/099,042

(22) Filed: Dec. 6, 2013

(51) Int. Cl.
*G08B 21/18* (2006.01)
*A01K 3/00* (2006.01)

(52) U.S. Cl.
CPC ............ *G08B 21/185* (2013.01); *A01K 3/005* (2013.01)

(58) Field of Classification Search
CPC .. G08B 21/185; G08B 13/122; G08B 29/00; A01K 2/005; A01K 3/005; G01R 31/3682; G01R 1/3606
See application file for complete search history.

(56) References Cited

U.S. PATENT DOCUMENTS

| | | | |
|---|---|---|---|
| 3,648,266 A | | 3/1972 | Crist |
| 4,725,825 A | * | 2/1988 | McKean ................ G08B 5/36 256/10 |
| 5,302,945 A | * | 4/1994 | Stoltenberg ............ A01K 3/005 256/10 |
| 6,265,981 B1 | | 7/2001 | Carson et al. |
| 2001/0011950 A1 | * | 8/2001 | Carson ................. G08B 13/122 340/635 |

FOREIGN PATENT DOCUMENTS

| WO | 2004095894 A1 | 11/2004 |
|---|---|---|
| WO | 2009028966 A1 | 3/2009 |

OTHER PUBLICATIONS

International Searching Authority Search Report and Written Opinion, dated Mar. 23, 2015 re: PCT/US2014/068845, 11 pages.

* cited by examiner

*Primary Examiner* — James Yang
(74) *Attorney, Agent, or Firm* — Mark A. Pitchford; Waller Lansden Dortch & Davis, LLP

(57) ABSTRACT

An electric fence monitor is operable to provide an audible and/or visual indicator of an operating condition (i.e., falter no-fault) of an electric fence and electric fence box. The electric fence monitor is operable to remain continuously connected between the electric fence and earth ground during normal operation of the fence.

8 Claims, 5 Drawing Sheets

ELECTRIC FENCE MONITOR INCLUDING AN AIR GAP

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electric fence monitors. More particularly, this invention pertains to providing continual audible and visual indicators of an operating condition (i.e., presence or absence of a fault condition) of a segment or length of electric fence.

Electric fences are used by ranchers and farmers to keep animals in a designated area or out of a designated area. Electric fences include a length of conductive material (i.e., the fencing) isolated from earth ground by insulators. The length of conductive material is connected to a fence charger (i.e., electric fence box). Checking and repairing fences is a major part of a farmer or rancher's job often requiring significant time and/or manpower. Faults in the electric fence are caused by animals running through the fence, plants growing up to the electric fence, or plants (e.g., trees) falling on the electric fence. Determining a fault an electric fence and finding the source of the fault is often time-consuming because the fence must be manually tested to track the source of the fault. In operation, the electric fence charger periodically sends a pulse of static electricity along the electric fence. Parasitic resistances and capacitances bleed much of the energy from the fence between pulses.

When working properly, the electric fence should periodically exhibit over 5000 volts on a tester when energized by the electric fence charger. A user momentarily connects the tester to the electric fence to determine a voltage on the fence. This process is repeated around the fence until the user determines a segment of the fence having the fault condition. Active, self-powered testers are limited by their battery life or to a location with powerline power available. Passive testers are capacitive or resistive based and draw down the voltage on the fence. Therefore, they cannot remain connected to the fence during normal operation (i.e., at all times). There are no passive testers that permanently connect to an electric fence to continually indicate the status (fault or no fault) of a length of electric fence between the tester and the electric fence charger (i.e., electric fence box).

BRIEF SUMMARY OF THE INVENTION

Aspects of the present invention provide an electric fence monitor operable to provide an audible and/or visual indicator of an operating condition (i.e., falter no-fault) of an electric fence and electric fence box.

In one aspect, an electric fence monitor is operable to provide a visual indicator and an audible indicator of an operating condition of a length of electric fence. The electric fence monitor includes a first contact, a second lead connected to a second contact, a housing, a light source, and a driver circuit. The first contact is operable to connect to the electric fence. The electric fences periodically energized by an electric fence charger. A length of the electric fence separates the fence charger from the first contact. The second contact is separated from the first contact binary gap. The air gap has a distance less than a critical distance such that an arc forms in the air gap when the electric fence charger energizes the electric fence and there is not a fault on the length of electric fence separating the fence charger from the first contact. The housing has a first end and a second end opposite the first end. The housing is operable to support the first contact and the second contact. The housing is enclosed at the first end and open at the second end. Electric fence monitor him it's an audible knock from the second end when the arc forms in the air gap. The light source is operable to provide light in response to receiving power. The driver circuit is connected between the second lead and a ground (e.g., Earth ground). The driver circuit is operable to receive electricity passing through the air gap via the second lead. The driver circuit is operable to provide power to the light source by converting the received electricity. The electric fence monitor emits a flash of light when the arc forms in the air gap and transfers power from the electric fence to the light source via the first contact, the air gap, the second contact, and the driver circuit.

In another aspect, an electric fence monitor is operable to provide a visual indicator of an operating condition of an electric fence. The electric fence monitor includes a first contact operable to connect to the electric fence, a second lead connected to a second contact, a light source, a driver circuit, and a base. The electric fences periodically energized by an electric fence charger. A length of the electric fence separates the fence charger from the first contact. The second contact is separated from the first contact binary gap. The air gap has a distance less than a critical distance such that an arc forms in the air gap when the electric fence charger energizes the electric fence and there is not a fault on the length of electric fence separating the fence charger from the first contact. The light source is operable to provide light in response to receiving power. The driver circuit is connected between the second lead and a ground (e.g., Earth ground). The driver circuit is operable to receive electricity passing through the air gap via the second lead. The driver circuit is further operable to provide power to the light source by converting the received electricity such that the electric fence monitor him it's a flash of light when the arc forms in the air gap and transfers power to the driver circuit from the electric fence via the first contact, the air gap, the second contact, and the second lead. The base is operable to support the light source and the driver circuit and secure to a fence post. Optionally, the base is further operable to receive a glass globe that cooperates with the base to substantially enclose the light source and the driver circuit.

In another aspect, an electric fence monitor is operable to provide an audible indicator of an operating condition of an electric fence. The electric fence monitor includes a first contact, a second lead connected to a second contact, and a housing. The first contact is operable to connect to the electric fence. The electric fences periodically energized by an electric fence charger. A length of the electric fence separates the fence charger from the first contact. The second contact is separated from the first contact by an air gap. The second lead is connected to a ground (e.g., Earth ground). The air gap has a distance less than a critical distance such that an arc forms in the air gap when the electric fence charger energizes the electric fence and there is not a fault on the length of electric fence separating the fence charger from the first contact. The housing has a first end and a second end opposite the first end. The housing is operable to support the first contact and the second contact. The housing is enclosed at the first end and opened at the second end such that the electric fence monitor emits an audible knock from the second end when the arc forms in the air gap.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As described herein, an upright position is considered to be the position of apparatus components while in proper operation or in a natural resting position as described herein. Vertical, horizontal, above, below, side, top, bottom and other orientation terms are described with respect to this upright position during operation unless otherwise specified.

The term "when" is used to specify orientation for relative positions of components, not as a temporal limitation of the claims or apparatus described and claimed herein unless otherwise specified.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams. The electrical connection may be direct or indirect (i.e., connected via one or more other elements).

Figure 1:
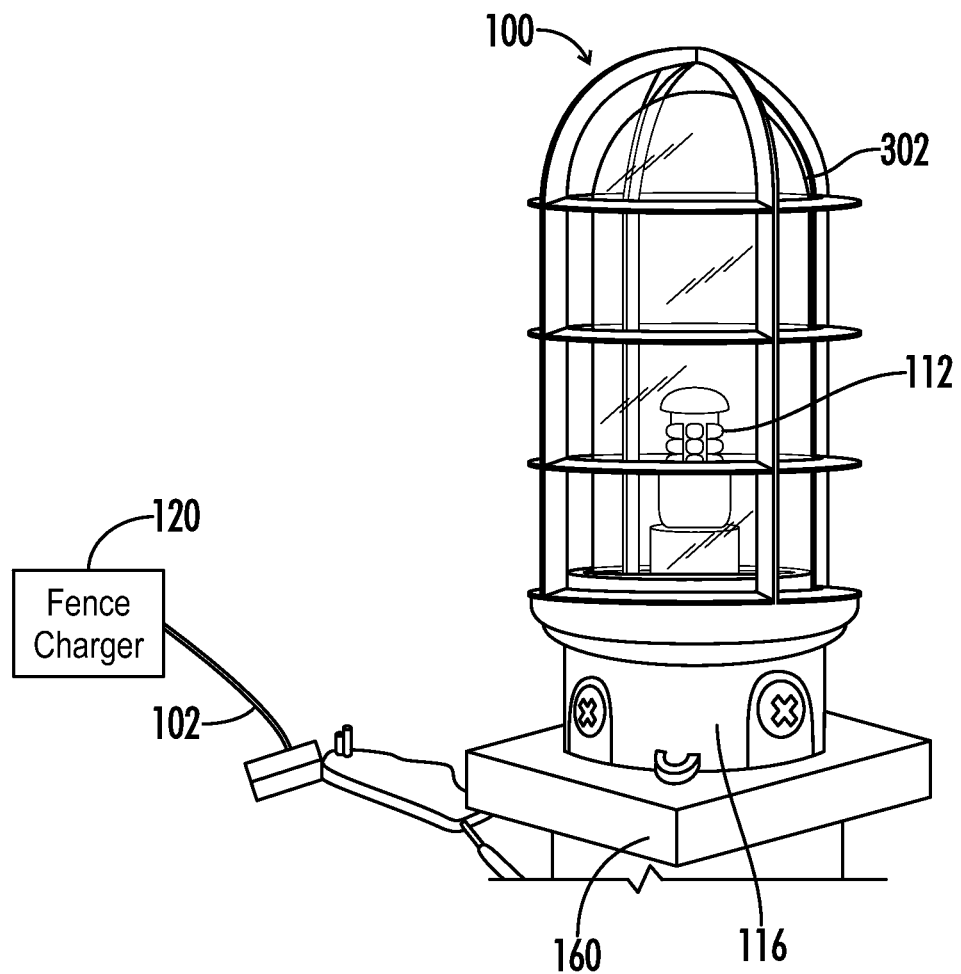
FIG. 1 is a side perspective view of an electric fence monitor operable to emit a visual indicator of an operating condition of an electric fence mounted or secured to a fence post.
Figure 2:
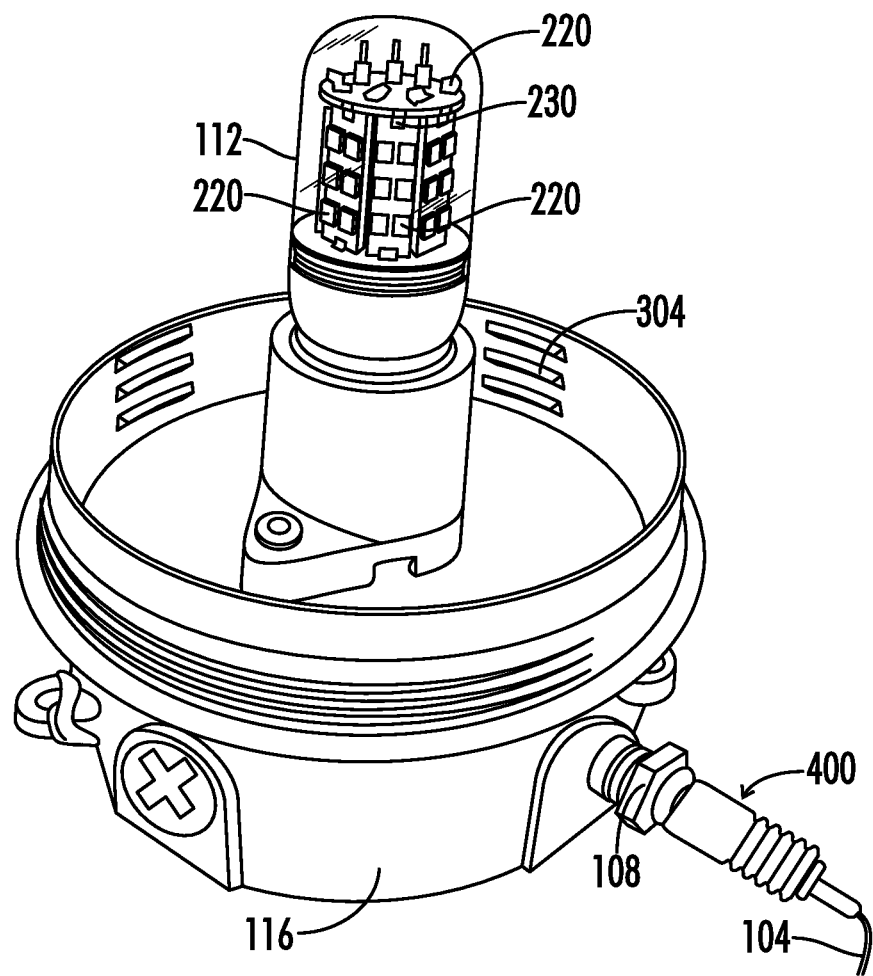
FIG. 2 is an isometric view of an electric fence monitor including internal first and second contacts operable to emit a visual indicator of an operating condition of an electric fence.
Figure 3:
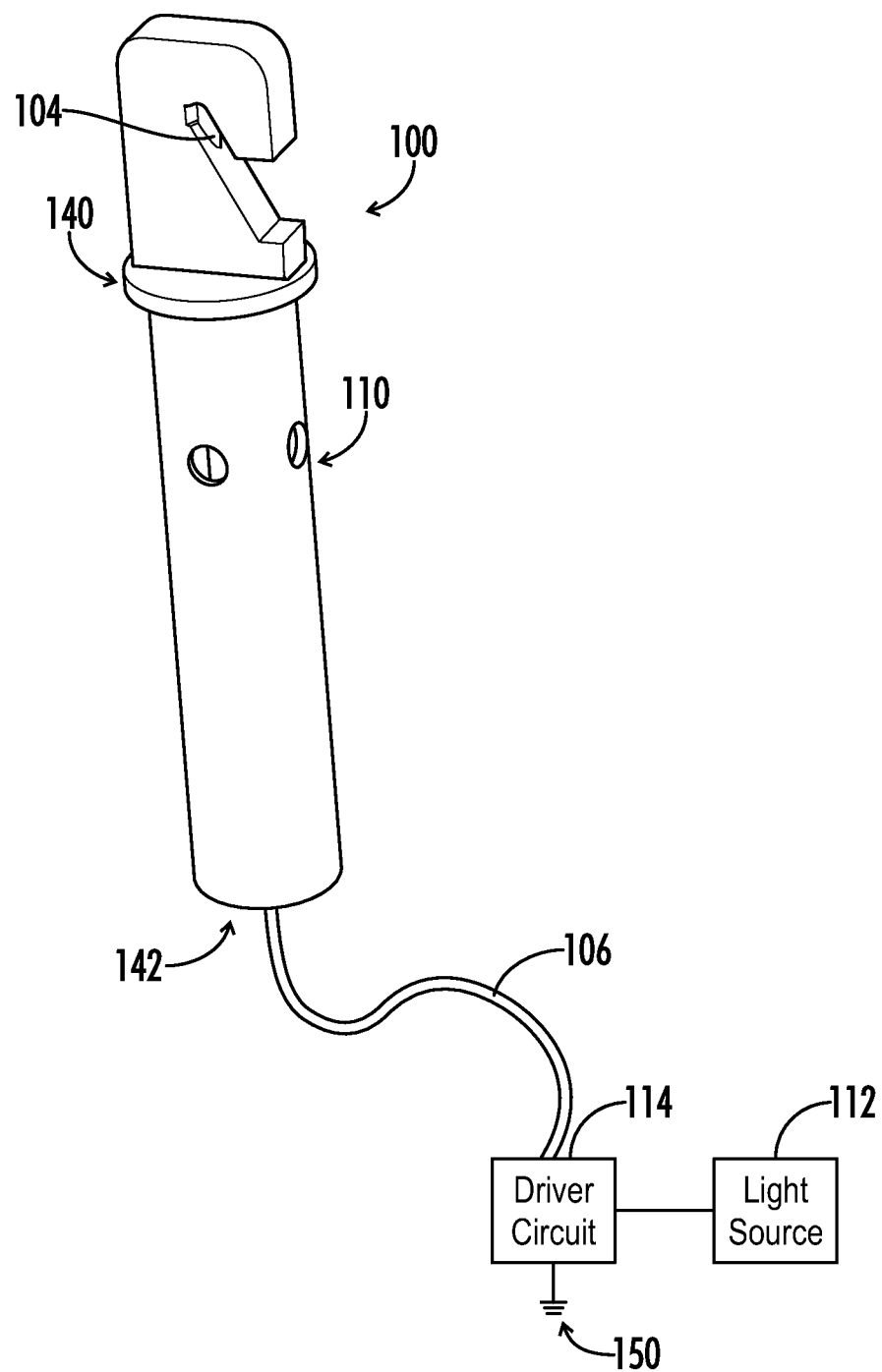
FIG. 3 is an isometric view of an electric fence monitor operable to provide an audible indicator of an operating condition of an electric fence.

Referring to FIGS. 1 and 3, an electric fence monitor 100 is operable to provide a visual indicator and an audible indicator of an operating condition of an electric fence 102. The electric fence monitor 100 includes a first contact 104, a second lead 106 connected to a second contact 108, a housing 110, a light source 112, a driver circuit 114, and a base 116. The first contact 104 is operable to connect to the electric fence 102. The electric fence 102 is periodically energized by an electric fence charger 120. A length of the electric fence 102 separates the fence charger 120 from the first contact 104. The second contact 108 is separated from the first contact 104 by an air gap 130. The air gap 130 has a distance 132 less than a critical distance. The critical distance is the distance at which an arc will no longer formed between the first contact 104 and the second contact 106 when the electric fence charger 120 energized as the electric fence 102. Because the air gap 130 has a distance 132 less than the critical distance, an arc forms in the air gap 130 when the electric fence charger 120 energizes the electric fence 102, as long as there is not a fault on the length of electric fence 102 separating the fence charger 120 from the first contact 104. Examples of faults that could be on the length of electric fence 102 include an open circuit (i.e., a broken fence) and a short-circuit to ground (i.e., an object laying on the fence and the ground or hanging from the fence to the ground).

The housing 110 has a first end 140 and a second end 142. The second end 142 is opposite the first end 140. The housing 110 is operable to support the first contact 104 and the second contact 108. The housing 110 is enclosed at the first end 140 and open at the second end 142 such that the electric fence monitor 100 admits an audible knock when the arc forms in the air gap 130.

The light source 112 is operable to provide light in response to receiving power. In one embodiment, the light source includes a plurality of light emitting diodes (LEDs) 220 and a core 230. Each LED 220 of the plurality of LEDs is configured to receive power from the driver circuit 114. The court core 230 is operable to support the plurality of LEDs 220. The plurality of LEDs 220 are arranged about the core 230 such that when the electric fence monitor 100 is secured to the fence post 160 in an upright orientation (see FIG. 1), the light emitted by the light source 112 is visible from any point above a horizontal plane through the light source 112. As can be seen in FIG. 1, light emitted by the light source 112 is also visible from many points below the horizontal plane through the light source 112. This enables a fence owner to determine the operating condition of the electric fence 102 from a position on the ground, from a mounted position, or from the air (e.g., by helicopter). The brightness of the LEDs 220 and ability to see the light source 112 from above the fence monitor 100 enables the visual indicator to be seen from a great distance. For large ranches that need to check multiple, separate fences powered by separate fence chargers, this enables the rancher to check the entire fence line from a continuous flight in a helicopter, or from a continuous ride in a mounted position (e.g., horseback or all terrain vehicle).

The driver circuit 114 is connected between the second the lead 106 and a ground 150 (e.g., earth ground). The driver circuit 114 is operable to receive electricity passing through the air gap 130 via the second lead 106. The driver circuit 114 provides power to the light source 112 by converting the received electricity such that the electric fence monitor 100 emits a flash of light each time that the arc forms in the air gap 130 and transfers power to the driver circuit 114 from the electric fence 102 (and ultimately from the electric fence charger 120).

The base 116 is operable to support the light source 112 and the driver circuit 114. The base 116 is also operable to secure to a surface such as a fence post 160. In one embodiment, the base 116 has a fitting operable to slip over the top of a steel safety post. In one embodiment, the base has a threaded portion 304. The threaded portion 304 is operable to receive a globe 302.

In one embodiment, the electric fence monitor 100 further includes the globe 302 operable to engage the base 116. The globe 302 may be glass or some other substantially transparent material. The globe 302 cooperates with the base 116 to enclose the light source 112 and driver circuit 114 such that it prevents precipitation from contacting the light source 112 or driver circuit 114. In one embodiment, the globe 302 has approximately 5 threads per inch, a thread height of approximately 0.060 inches, a thread top radius of approximately 0.044 inches, a base corner route radius of approximately 0.030 inches, thread sides approximately 30° from vertical, and an inside diameter of approximately 2⅜ inches. The threaded portion 304 of the base 116 is operable to receive a globe 302. It is contemplated that other thread patterns may be used, for example, widemouth canning jar threads (e.g., approximately 3 inches inside diameter).

In one embodiment, the base 116 is operable to substantially enclose the first contact 104 and the second contact 108. In one embodiment, first contact 104 and the second contact 108 are embodied by a spark plug 400 inserted into the base 116. The electrode of the spark plug 400 ax as the first contact 104, and the threads of the spark plug 400 are part of the second contact 108. In this embodiment, a first lead directly connects the first contact 104 to the electric fence 102, and the electric fence monitor 100 is not capable of producing a substantial audible indicator.

Figure 4:
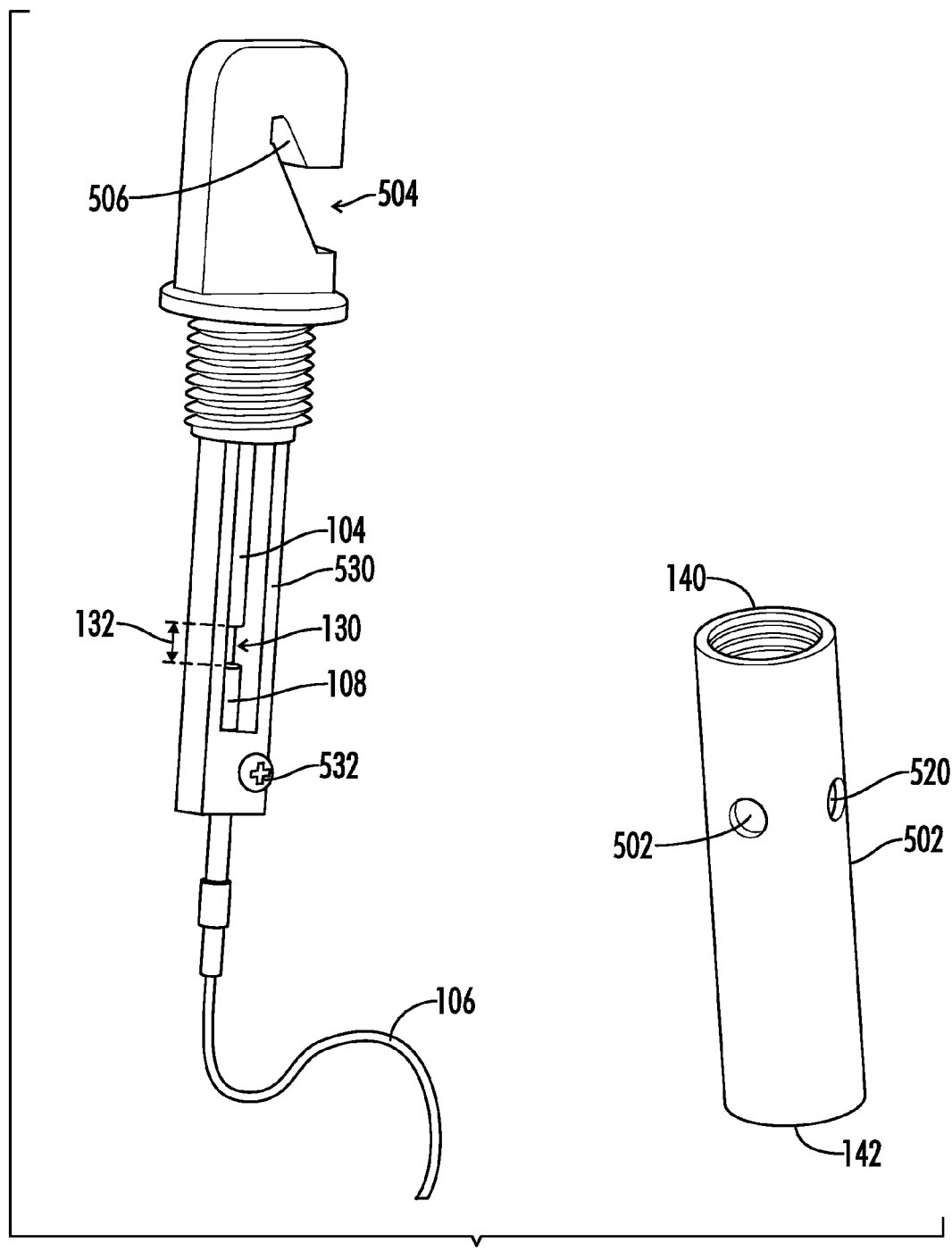
FIG. 4 is a partially exploded isometric view of an electric fence monitor operable to provide an audible indicator of an operating condition of an electric fence of FIG. 3.

Referring to FIGS. 3 and 4, one embodiment of the housing 110 is shown in further detail. The housing 110 includes a tubular portion 502 and an end cap 504. The tubular portion 502 is approximately 2 inches long with approximately one half inch inside diameter. The end cap 504 is at the first end 140 of the housing 110. The end cap 504 includes a hook 506 configured to hang the housing 110 on the electric fence 102 with the first contact 104 electrically connected to the electric fence 102 and the first end 140 of the housing 110 above the second end 142 of the housing 110. In one embodiment, the end cap 504 adds approximately one half inch to the length of the tubular portion 5024 and overall length of approximately 2½ inches. In one embodiment, the tubular portion 502 has one or more holes 520 therethrough. The holes 520 in the housing 110 tune the knocking sound of the arc in the air gap 130 and project the knocking sound horizontally from the housing 110. In one embodiment, the length of the tubular portion 502 and the location and size of the holes 520 combined to tune a frequency of the knocking sound of the arc in the air gap 130 to a predetermined frequency. The predetermined frequency is selected to maximize projection of the knocking sound produced by the arc in the air gap 130. Generally, this knock can be heard from a significant distance (e.g., in excess of 100 yards, depending on terrain and background noise).

In one embodiment, the housing 110 further includes a vise 530 and a retainer screw 532. The vise 530 is configured to maintain the first contact 104 and the second contact 108 at the distance of the air gap 130. That is, the vise 530 maintains a predetermined distance between the first contact 104 and the second contact 108 during normal operation. The retainer screw 532 is configured to close the vise 530 on at least one of the first contact 104 and the second contact 108. That is, the retainer screw 532 clamps the vise 530 down on at least one of the contacts to hold them in position during normal operation. Thus, the distance of the air gap 130 is adjustable by unscrewing the end cap 504 from the tubular portion 502 of the housing 110, loosening the retainer screw 532, moving the first and second contacts 104, 108 closer or further apart, tightening the retainer screw 532, and screwing the end cap 504 back onto the tubular portion 502 of the housing 110.

Figure 5:
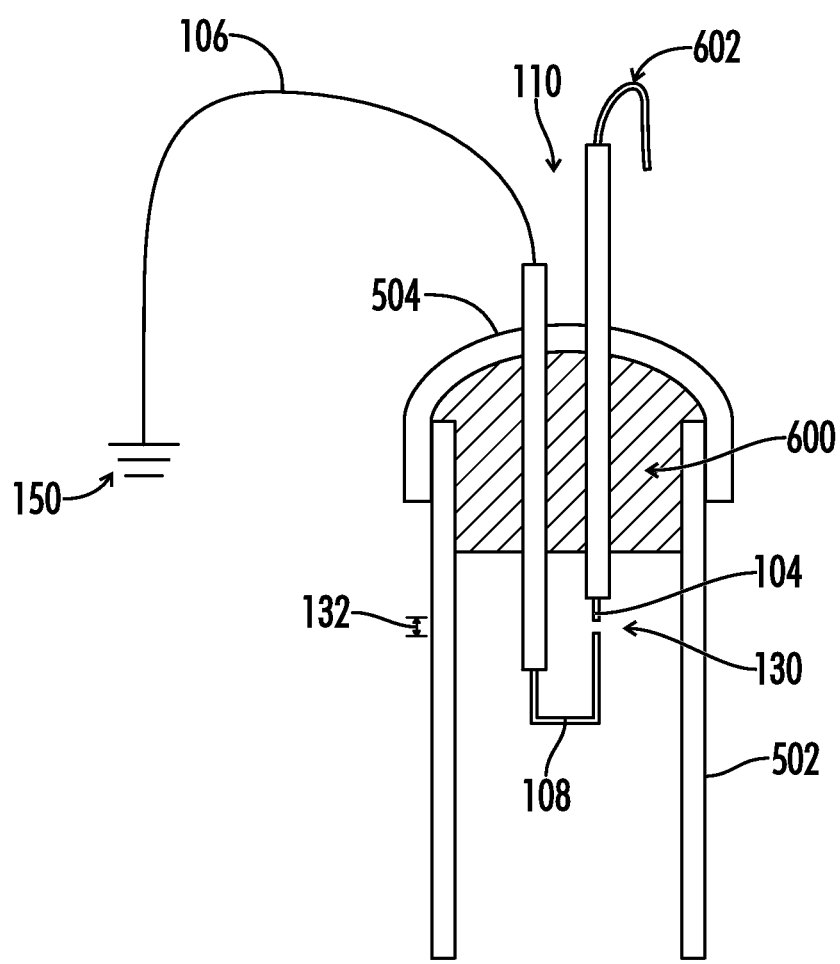
FIG. 5 is a side cutaway view of an electric fence monitor operable to provide an audible indicator of an operating condition of an electric fence.

Referring to FIG. 5, alternative features of the housing 110 are shown. In the embodiment of FIG. 5, at least one of the first lead 602 and the second lead 106 penetrate the end cap 504. The end cap 504 is substantially filled with a hardening compound 600 (e.g., epoxy or silicon silicone). The hardening compound 600 at least partially encapsulates one of the first lead 602 and the second the lead 106. In one embodiment, the first lead 602 forms a hook for engaging the electric fence 102 and hanging the housing 110 from the electric fence 102. In another embodiment, a clamp is connected to the first lead 602, and the clamp is operable to engage the electric fence (i.e., or clip onto the electric fence 102), conduct electricity to the first lead 602, and hang the housing 110 from the electric fence 102 with the first end 140 of the housing 110 above the second end 142 of the housing 110.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful ELECTRIC FENCE MONITOR INCLUDING AN AIR GAP it is not intended that such references be construed as limitations upon the scope of this invention except as set forth in the following claims.

What is claimed is:

1. An electric fence monitor operable to provide a visual indicator and an audible indicator of an operating condition of an electric fence, said electric fence monitor comprising:
   a first contact, wherein:
      the first contact is operable to connect to the electric fence;
      the electric fence is periodically energized by an electric fence charger;
      a length of the electric fence separates the fence charger from the first contact;
   a second lead connected to a second contact, wherein:
      the second contact is separated from the first contact by an air gap;
      the air gap has a distance less than a critical distance such that an arc forms in the air gap when the electric fence charger energizes the electric fence and there is not a fault on the length of electric fence separating the fence charger from the first contact;
   a housing having a first end and a second end opposite the first end, wherein:
      the housing is operable to support the first contact and the second contact; and
      the housing enclosed at the first end, and open at the second end such that the electric fence monitor emits an audible knock when the arc forms in the air gap;
   a light source operable to provide light in response to receiving power;
   a driver circuit connected between the second lead and a ground, wherein:
      the driver circuit is operable to receive electricity passing through the air gap via the second lead; and
      the driver circuit is operable to provide power to the light source by converting the received electricity such that the electric fence monitor emits a flash of light when the arc forms in the air gap and transfers power to the driver circuit; and
   a base operable to support the light source and driver circuit and secure to a fence post.

2. The electric fence monitor of claim 1, wherein:
   the light source comprises a plurality of light emitting diodes (LEDs) configured to receive power from the driver circuit;
   the light source comprises a core supporting the plurality of LEDs;
   wherein the plurality of light emitting diodes are arranged about the core such that when the electric fence monitor is secured to the fence post in an upright orientation, the light emitted by the light source is visible from any point above a horizontal plane through the light source.

3. The electric fence monitor of claim 1, wherein:
   the light source comprises a plurality of light emitting diodes (LEDs) configured to receive power from the driver circuit; and
   the light source comprises a core supporting the plurality of LEDs.

4. The electric fence monitor of claim 1, further comprising a globe operable to engage the base and enclose the driver circuit and light source and prevent precipitation from contacting the light source or driver circuit.

5. The electric fence monitor of claim 1, wherein the housing comprises a tubular portion having one or more hole through the tubular portion of the housing.

6. An electric fence monitor operable to provide an audible indicator of an operating condition of an electric fence, said electric fence monitor comprising:
   a first contact, wherein:
      the first contact is operable to connect to the electric fence;
      the electric fence is periodically energized by an electric fence charger;
      a length of the electric fence separates the fence charger from the first contact;
   a second lead connected to a second contact, wherein:
      the second contact is separated from the first contact by an air gap;
      the second lead is connected to a ground;
      the air gap has a distance less than a critical distance such that an arc forms in the air gap when the electric fence charger energizes the electric fence and there is not a fault on the length of electric fence separating the fence charger from the first contact; and
   a housing having a first end and a second end opposite the first end, wherein:
      the housing is operable to support the first contact and the second contact; and
      the housing is enclosed at the first end, and open at the second end such that the electric fence monitor emits an audible knock when the arc forms in the air gap.

7. The electric fence monitor of claim 6, further comprising:
   a first lead configured to connect the first contact to the electric fence; and
   a clamp connected to the first lead, said clamp operable to engage the electric fence, conduct electricity to the first lead, and hang the housing from the electric fence with the first end of the housing above the second end of the housing.

8. The electric fence monitor of claim 6, wherein the housing comprises a tubular portion having one or more holes through the tubular portion of the housing.

* * * * *